United States Patent
Lin et al.

(10) Patent No.: US 11,781,048 B2
(45) Date of Patent: Oct. 10, 2023

(54) ONE-COMPONENT THERMOSETTING EPOXY ADHESIVE WITH IMPROVED ADHESION

(71) Applicant: SIKA TECHNOLOGY AG, Baar (CH)

(72) Inventors: Geng Lin, Rochester Hills, MI (US); Blanka Proko, Macomb Township, MI (US)

(73) Assignee: SIKA TECHNOLOGY AG, Baar (CH)

( * ) Notice: Subject to any disclaimer, the term of this patent is extended or adjusted under 35 U.S.C. 154(b) by 366 days.

(21) Appl. No.: 17/007,604

(22) Filed: Aug. 31, 2020

(65) Prior Publication Data
US 2022/0064505 A1    Mar. 3, 2022

(51) Int. Cl.
| | | |
|---|---|---|
| C09J 163/04 | (2006.01) | |
| C08G 59/24 | (2006.01) | |
| C08G 59/32 | (2006.01) | |
| C08G 59/40 | (2006.01) | |
| C08K 5/00 | (2006.01) | |
| C08G 59/50 | (2006.01) | |

(52) U.S. Cl.
CPC .......... *C09J 163/04* (2013.01); *C08G 59/245* (2013.01); *C08G 59/32* (2013.01); *C08G 59/4021* (2013.01); *C08G 59/5086* (2013.01); *C08K 5/0025* (2013.01); *C09J 2203/354* (2020.08); *C09J 2301/304* (2020.08); *C09J 2301/408* (2020.08)

(58) Field of Classification Search
None
See application file for complete search history.

(56) References Cited

U.S. PATENT DOCUMENTS

| | | | | |
|---|---|---|---|---|
| 6,495,653 | B1 * | 12/2002 | Kinsho | C08G 67/04 528/370 |
| 6,653,371 | B1 * | 11/2003 | Burns | C08K 5/0008 523/455 |
| 2020/0172775 | A1 * | 6/2020 | Kokkot | B32B 5/02 |
| 2021/0155835 | A1 * | 5/2021 | Lutz | C08L 79/02 |
| 2021/0340309 | A1 * | 11/2021 | White | C09J 163/00 |
| 2022/0153988 | A1 * | 5/2022 | Simon | C08G 59/686 |
| 2022/0195267 | A1 * | 6/2022 | Lutz | C08L 75/08 |
| 2022/0228033 | A1 * | 7/2022 | Frick | C09J 7/26 |

FOREIGN PATENT DOCUMENTS

WO    2013/142750 A2    9/2013

* cited by examiner

*Primary Examiner* — Megan McCulley
(74) *Attorney, Agent, or Firm* — Oliff PLC

(57) ABSTRACT

A one-component thermosetting epoxy resin adhesive, including a) at least one epoxy resin A of formula (II)

(II)

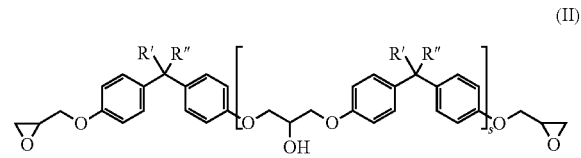

wherein substituents R' and R" independently of one another are H or $CH_3$ and index s has value of 0-12, fraction of epoxy resin A being from 20-70 wt.-%, based on total weight of one-component thermosetting epoxy resin adhesive; and b) at least one epoxy novolac EN of formula

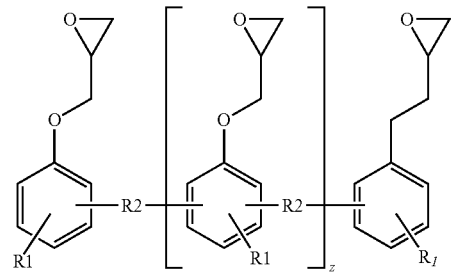

where R2=

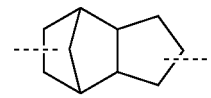

or $CH_2$, R1=H or methyl and z=0-7, fraction of epoxy novolac EN being from 1-8 wt.-% based on total weight of one-component thermosetting epoxy resin adhesive; and c) at least one latent hardener B for epoxy resins; and d) at least one accelerator C for epoxy resins; and e) at least at least one toughness improver D, fraction of toughness improver D being from 5-40 wt.-%, based on total weight of one-component thermosetting epoxy resin adhesive.

18 Claims, No Drawings

ONE-COMPONENT THERMOSETTING EPOXY ADHESIVE WITH IMPROVED ADHESION

TECHNICAL FIELD

The present invention pertains to the field of one-component thermosetting epoxy resin adhesives and also to the use thereof particularly in vehicle construction.

PRIOR ART

Thermosetting, one-component epoxy resin adhesives have already been used for some considerable time as adhesives in body construction.

One important field of use of one-component thermosetting epoxy resin adhesives, accordingly, is in vehicle construction, where typically there are metal substrates such as steel sheets and aluminium present, particularly in the context of adhesive bonding. Following the application of the epoxy resin composition, the bodywork is heated in the CEC (cathodic electrocoating) oven, by means of which the thermosetting epoxy resin composition as well is cured.

WO 2013142750 A2 describes heat curable structural adhesives in vehicle construction. In the experimental part, adhesives are disclosed that contain 0.6 to 0.7 wt.-% of an activatable catalyst consisting of a mixture of a tertiary amine and a novolac resin.

Such structural adhesives have to fulfil a variety of requirements including good adhesion on metal substrates such as steel sheets, especially oiled steel sheets, and aluminium, good mechanical properties and sufficient stress resistance. These requirements are particularly difficult to meet when low curing temperatures, especially when a temperature below 170° C. is used.

However, efforts are currently under way in the market to lower the temperature of the cathodic electrocoating ovens. Thus, there is a great need in the market for one-component epoxy resin adhesives that cure even at relatively low temperatures, i.e. at a temperature of 160 to 170° C., even after a short time, typically 10 to 15 minutes.

Sufficient stress resistance, especially determined based on the "Ford Standards Testing" procedure of "BV 101-07 Stress durability test for lap-shear bonds", is not meet with the structural adhesives of the state of the art at such low curing temperatures.

SUMMARY OF THE INVENTION

It is an object of the present invention, therefore, to provide a one-component thermosetting epoxy resin adhesive which shows good adhesion on metal substrates, good mechanical properties and good stress resistance when cured at temperatures below 170° C.

Surprisingly it has been found that this object can be achieved with the one-component thermosetting epoxy resin adhesive as defined in claim 1.

Further aspects of the invention are subjects of further independent claims. Particularly preferred embodiments of the invention are subjects of the dependent claims.

Certain Embodiments of the Invention

The present invention therefore relates to a one-component thermosetting epoxy resin adhesive, comprising
a) at least one epoxy resin A of the formula (II)

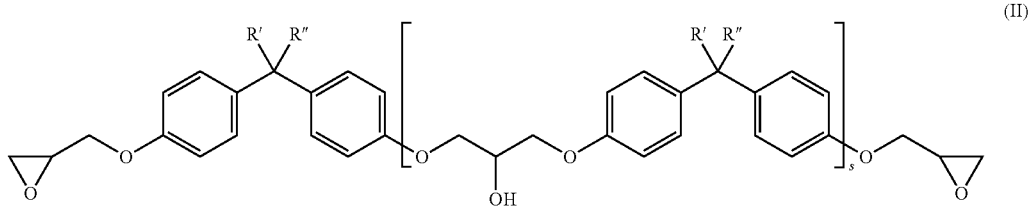

wherein the substituents R' and R" independently of one another are either H or $CH_3$ and the index s has a value of 0-12, preferably 0-1, the fraction of the epoxy resin A being from 20-70 wt.-%, based on the total weight of the one-component thermosetting epoxy resin adhesive; and
b) at least one epoxy novolac EN of the formula

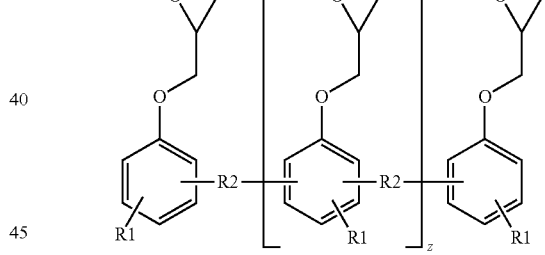

where R2=

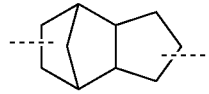

or $CH_2$, R1=H or methyl and z=0-7, preferably 0-3, 1-2, most preferably 1.5-2, the fraction of epoxy novolac EN being from 1-8 wt.-% based on the total weight of the one-component thermosetting epoxy resin adhesive; and
c) at least one latent hardener B for epoxy resins; and
d) preferably at least one accelerator C for epoxy resins; and
e) at least at least one toughness improver D, the fraction of toughness improver D being from 5-40 wt.-%, 7.5-35 wt.-%, 10-30 wt.-%, more preferably 15-25 wt.-%, based on the total weight of the one-component thermosetting epoxy resin adhesive.

The epoxy resin adhesive has a viscosity of 500 to 5000 Pas, 500 to 2000 Pas, 500 to 1500 Pas, preferably 500 to 1300 Pas at 25° C., the viscosity being determined oscillographically by means of a rheometer with heatable plate (MCR 301, AntonPaar) (slot 1000 μm, measuring plate diameter: 25 mm (plate/plate), deformation 0.01 at 5 Hz, temperature: 25° C.).

The epoxy resin adhesive is one-component, meaning that the constituents of the epoxy resin adhesive, more particularly the epoxy resin and the hardener, are present in one component, without curing taking place at usual ambient temperature or room temperature. The one-component epoxy resin adhesive is therefore storage-stable. It can therefore be handled in this form, whereas with two-component systems the components cannot be mixed until immediately prior to use.

The curing of the one-component epoxy resin adhesive is accomplished by heating, typically at a temperature of more than 70° C., as in the range from 100 to 220° C., for example.

The prefix "poly" in expressions such as polyol or polyisocyanate denotes that the compound has two or more of the stated groups. A polyisocyanate, for example, is a compound having two or more isocyanate groups.

The expression "independently of one another" as used below means that in the same molecule, two or more identically denoted substituents may have identical or different meanings in accordance with the definition.

The dashed lines in the formulae in this document represent in each case the bond between the substituent in question and the associated remainder of the molecule.

Room temperature refers here to a temperature of 23° C., unless otherwise indicated.

The thermosetting one-component epoxy resin adhesive comprises at least one epoxy resin A of the formula (II)

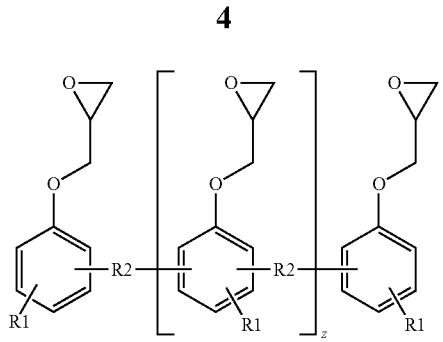

where R2=

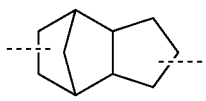

or $CH_2$, R1=H or methyl and z=0-7, preferably 0-3, 1-2, most preferably 1.5-2.

Preferably, in the epoxy novolac EN R2=$CH_2$ and R1=H and z=1-2.

Suitable epoxy novolac EN are marketed under the commercial designations D.E.N. 439 (EEW 191 to 210 g/eq, functionality 3.8), D.E.N. 438 (EEW 176 to 181 g/eq, functionality 3.6) and D.E.N. 431 (EEW 172 to 179 g/eq, functionality 2.8). D.E.N. 439 being especially preferred.

The fraction of epoxy novolac EN is from 1-8 wt.-%, based on the total weight of the one-component thermosetting epoxy resin adhesive. Amounts of less than 1 wt.-% lead to insufficient stress stability when cured at temperatures of less than 170° C. Amounts of more than 8 wt.-% lead to insufficient values for the mechanical properties.

(II)

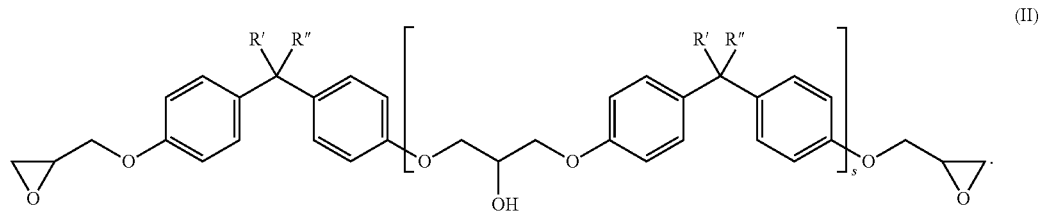

The substituents R' and R" independently of one another are either H or $CH_3$, preferably $CH_3$, and the index s has a value of 0-12, preferably 0-1, more preferably 0-0.2.

Preferably, in the epoxy resin A the substituents R' and R" are $CH_3$ and the index s has a value of 0-1, preferably 0-0.2.

The fraction of the epoxy resin A is from 20-70 wt.-%, based on the total weight of the one-component thermosetting epoxy resin adhesive, preferably from 25-70 wt.-%, 30-60 wt.-%, 35-55 wt.-%, most preferably 40-50 wt.-%.

The resins in question are therefore preferably diglycidyl ethers of bisphenol A (DGEBA), of bisphenol F and also of bisphenol A/F. Liquid resins of these kinds are available for example as Araldite® GY 250, Araldite® PY 304, Araldite® GY 282 (Huntsman) or D.E.R.™ 331 or D.E.R.™ 330 (Dow) or Epikote 828 (Hexion).

The thermosetting one-component epoxy resin adhesive further comprises at least one epoxy novolac EN of the formula Preferably, the fraction of epoxy novolac EN is from 2-7 wt.-%, 3-6 wt.-%, 3.5-5.5 wt.-%, more preferably 4-5 wt.-%, based on the total weight of the one-component thermosetting epoxy resin adhesive. This leads to high values in stress durability when cured at 160° C. for 10 min. This is shown for example in table 1 in the comparison of Ref. with Ex.1-3 and comparing Ex. 2 with Ex. 1 and Ex.3.

Preferably, the thermosetting one-component epoxy resin adhesive further comprises at least one epoxy-bearing reactive diluent G. Such reactive diluents are known to those skilled in the art. Preferred examples of epoxy-bearing reactive diluents are:

glycidyl ethers of monofunctional saturated or unsaturated, branched or unbranched, cyclic or open-chain $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether etc.;

glycidyl ethers of difunctional saturated or unsaturated, branched or unbranched, cyclic or open-chain $C_2$-$C_{30}$ alcohols, for example ethylene glycol glycidyl ether, butanediol glycidyl ether, hexanediol glycidyl ether, octanediol glycidyl ether, cyclohexanedimethanol diglycidyl ether, neopentyl glycol diglycidyl ether etc.;

glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylolpropane etc.;

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashewnutshell oil), N,N-diglycidylaniline, etc.;

epoxidized amines such as N,N-diglycidylcyclohexylamine etc.;

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids etc.;

epoxidized di- or trifunctional, low to high molecular weight polyether polyols, such as polyethylene glycol diglycidyl ether, polypropylene glycol diglycidyl ether etc.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Preferably, the fraction of the epoxy-bearing reactive diluent G is from 1-10 wt.-%, 1.5-7.5 wt.-%, 2-5 wt.-%, more preferably 2-3 wt.-%, based on the total weight of the one-component thermosetting epoxy resin adhesive.

The thermosetting one-component epoxy resin adhesive further comprises at least one latent hardener B for epoxy resins. Latent hardeners are substantially inert at room temperature and are activated by elevated temperature, typically at temperatures of 70° C. or more, thereby initiating the curing reaction. The customary latent hardeners for epoxy resins can be used. Preference is given to a latent epoxy resin hardener B containing nitrogen.

The latent hardener B is preferably selected from dicyandiamide, guanamines, guanidines, aminoguanidines and derivatives thereof, substituted ureas, imidazoles and amine complexes, preferably dicyandiamide.

The latent hardener B is preferably used in a stoichiometric amount based on the epoxy groups in the composition. The molar ratio of the epoxy groups to the active hydrogen of the latent hardener B is preferably 0.8 to 1.2, in particular 0.9 to 1.1, preferably 0.95 to 1.05.

The fraction of the latent hardener B is preferably 0.5 to 12 wt %, more preferably 1 to 8 wt %, more particularly 2-6 wt %, based on the total weight of the epoxy resin adhesive.

The thermosetting one-component epoxy resin adhesive further comprises at least one accelerator C for epoxy resins.

Such accelerating curing agents are preferably substituted ureas, for example 3-(3-chloro-4-methylphenyl)-1,1-dimethylurea (chlortoluron) or phenyldimethylureas, especially p-chlorophenyl-N, N-dimethylurea (monuron), 3-phenyl-1, 1-dimethylurea (fenuron) or 3,4-dichlorophenyl-N, N-dimethylurea (diuron). In addition, it is possible to use compounds from the class of the imidazoles, such as 2-isopropylimidazole or 2-hydroxy-N-(2-(2-(2-hydroxyphenyl)-4,5-dihydroimidazol-1-yl)ethyl)benzamide, imidazolines, trihalide complexes, preferably BF₃ complexes, blocked amines and encapsulated amines.

Preferably, the accelerator C for epoxy resins is selected from the list consisting of substituted ureas, imidazoles, imidazolines and blocked amines, preferably substituted ureas.

More preferably, the accelerator C for epoxy resins is selected from the list consisting of substituted ureas and blocked amines, especially when the latent hardener B is a guanidine, especially dicyandiamide.

Most preferably, the latent hardener B is a guanidine, especially dicyandiamide, and the one-component thermosetting epoxy resin composition additionally includes an accelerator C for epoxy resins, selected from the list consisting of substituted ureas and blocked amines, especially substituted ureas.

Preferably, the fraction of the accelerator C for epoxy resins is from 0.05-2 wt.-%, 0.1-1 wt.-%, 0.15-0.5 wt.-%, more preferably 0.2-0.3 wt.-%, based on the total weight of the one-component thermosetting epoxy resin adhesive.

The one-component thermosetting epoxy resin adhesive comprises at least one toughness improver D. The toughness improvers D may be solid or liquid.

The fraction of toughness improver D is from 5-40 wt.-%, preferably from 7.5-35 wt.-%, 10-30 wt.-%, more preferably 15-25 wt.-%, based on the total weight of the epoxy resin adhesive.

More particularly the toughness improver D is selected from the group consisting of terminally blocked polyurethane polymers D1, liquid rubbers D2 and core-shell polymers D3. With preference the toughness improver D is selected from the group consisting of terminally blocked polyurethane polymers D1 and liquid rubbers D2, most preferably a terminally blocked polyurethane polymer D1.

Where the toughness improver D is a terminally blocked polyurethane polymer D1, it is preferably a terminally blocked polyurethane prepolymer of the formula (I).

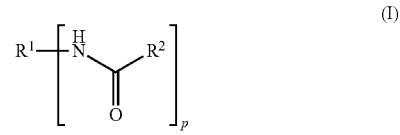

In this formula, $R^1$ is a p-valent radical of a linear or branched polyurethane prepolymer terminated by isocyanate groups, following the removal of the terminal isocyanate groups, and p has a value of 2 to 8.

Moreover, $R^2$ independently at each occurrence is a substituent which is selected from the group consisting of

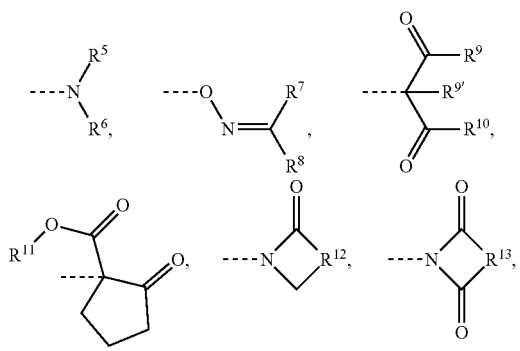

-continued

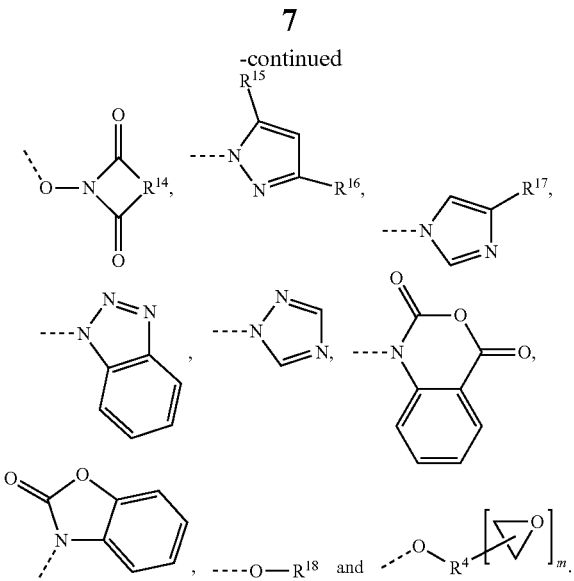

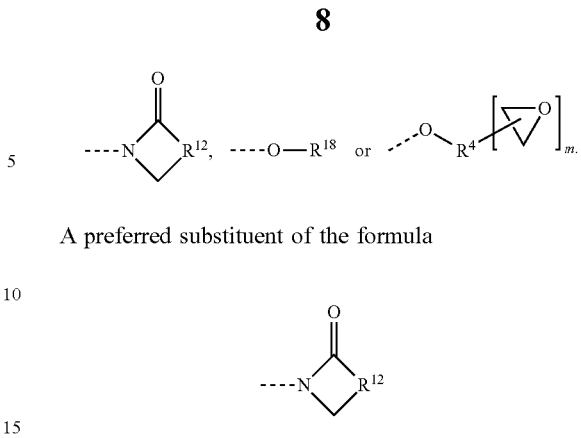

A preferred substituent of the formula

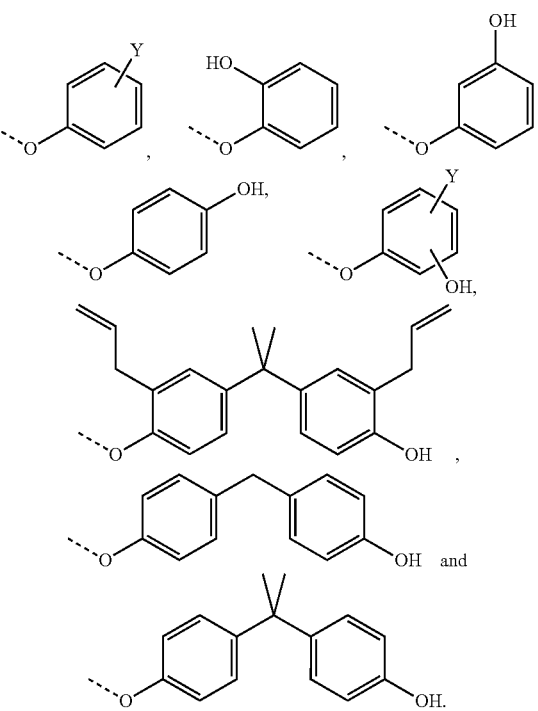

is ε-caprolactam after removal of the NH proton.

Preferred substituents of the formula - - —O—$R^{18}$ are monophenols or polyphenols, more particularly bisphenols, after removal of a phenolic hydrogen atom. Particularly preferred examples of such radicals $R^2$ are radicals which are selected from the group consisting of In these formulae, $R^5$, $R^6$, $R^7$ and $R^8$ each independently of one another are an alkyl or cycloalkyl or aralkyl or arylalkyl group, or $R^5$ together with $R^6$, or $R^7$ together with $R^8$, forms part of a 4- to 7-membered ring which is optionally substituted.

Moreover, $R^{9'}$ and $R^{10}$ each independently of one another are an alkyl or aralkyl or arylalkyl group or are an alkyloxy or aryloxy or aralkyloxy group, and $R^{11}$ is an alkyl group.

$R^{12}$, $R^{13}$ and $R^{14}$ each independently of one another are an alkylene group having 2 to 5 carbon atoms, which optionally has double bonds or is substituted, or are a phenylene group or are a hydrogenated phenylene group.

$R^{15}$, $R^{16}$ and $R^{17}$ each independently of one another are H or are an alkyl group or are an aryl group or an aralkyl group, and $R^{18}$ is an aralkyl group or is a mono- or polycyclic, substituted or unsubstituted aromatic group which optionally has aromatic hydroxyl groups.

Lastly, $R^4$ is a radical of an aliphatic, cycloaliphatic, aromatic or araliphatic epoxide containing a primary or secondary hydroxyl group, after the removal of the hydroxyl and epoxide groups, and m has a value of 1, 2 or 3.

$R^{18}$ should be considered to comprise, in particular, on the one hand, phenols or polyphenols, more particularly bisphenols, after removal of a hydroxyl group. Preferred examples of such phenols and bisphenols are, in particular, phenol, cresol, resorcinol, pyrocatechol, cardanol (3-pentadecenylphenol (from cashew nut shell oil)), nonylphenol, phenols reacted with styrene or with dicyclopentadiene, bisphenol A, bisphenol F and 2,2'-diallylbisphenol A. $R^{18}$ should be considered on the other hand to comprise, in particular, hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this group more particularly is a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is more particularly an aromatic group bonded via methylene, more particularly a benzyl group.

If $R^5$, $R^6$, $R^7$, $R^8$, $R^9$, $R^{9'}$ or $R^{10}$ is an alkylaryl group, this group is more particularly $C_1$ to $C_{20}$ alkyl group bonded via phenylene, such as tolyl or xylyl, for example.

The radicals $R^2$ are preferably the substituents of the formulae

The radical Y in these formulae is a saturated, aromatic or olefinically unsaturated hydrocarbyl radical having 1 to 20 carbon atoms, more particularly having 1 to 15 carbon atoms. Preferred as Y are, in particular, allyl, methyl, nonyl, dodecyl, phenyl, alkyl ether, carboxylic ester or an unsaturated $C_{15}$ alkyl radical having 1 to 3 double bonds.

Most preferably $R^2$ is - - —O—$R^{18}$.

The terminally blocked polyurethane prepolymer of the formula (I) is prepared from the linear or branched polyurethane prepolymer, terminated by isocyanate groups, with one or more isocyanate-reactive compounds $R^2H$. If two or more such isocyanate-reactive compounds are used, the reaction may take place sequentially or with a mixture of these compounds.

The reaction preferably takes place such that the one or more isocyanate-reactive compounds $R^2H$ are used stoichiometrically or in a stoichiometric excess, in order to ensure that all of the NCO groups have undergone reaction.

The polyurethane prepolymer having isocyanate end groups on which $R^1$ is based may be prepared from at least one diisocyanate or triisocyanate and also from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc., and also their dimers. Preferred are HDI, IPDI, MDI or TDI.

Suitable triisocyanates are trimers or biurets of aliphatic, cycloaliphatic, aromatic or araliphatic diisocyanates, more particularly the isocyanurates and biurets of the diisocyanates described in the preceding paragraph. It is of course also possible to use suitable mixtures of di- or triisocyanates.

Particularly suitable as polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, more particularly of 600-4000, preferably of 700-2200 g/equivalent of NCO-reactive groups.

Preferred polymers $Q_{PM}$ are polyols having average molecular weights of between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers, and mixtures thereof.

Especially preferred as polymers $Q_{PM}$ are α,ω-dihydroxypolyalkylene glycols having $C_2$-$C_6$ alkylene groups or having mixed $C_2$-$C_6$ alkylene groups, which are terminated with amino, thiol or, preferably, hydroxyl groups. Particularly preferred are polypropylene glycols or polybutylene glycols. Further particularly preferred are hydroxyl-group-terminated polyoxybutylenes.

Especially suitable as polyphenol $Q_{PP}$ are bis-, tris- and tetraphenols. The term refers not only to pure phenols, but instead also, where appropriate, to substituted phenols. The nature of the substitution can be very diverse. Understood more particularly by this is substitution directly on the aromatic ring system to which the phenolic OH group is bonded. Phenols, moreover, are not only monocyclic aromatics, but also polycyclic or fused aromatic or heteroaromatics, having the phenolic OH group directly on the aromatic or heteroaromatic moiety.

In one preferred embodiment, the polyurethane prepolymer is prepared from at least one diisocyanate or triisocyanate and also from one polymer $Q_{PM}$ having terminal amino, thiol or hydroxyl groups. The polyurethane prepolymer is prepared in a manner known to the person skilled in the polyurethane art, more particularly by using the diisocyanate or triisocyanate in a stoichiometric excess in relation to the amino, thiol or hydroxyl groups of the polymer $Q_{PM}$.

The polyurethane prepolymer having isocyanate end groups is preferably elastic in nature. It preferably exhibits a glass transition temperature Tg of less than 0° C.

The toughness improver D may be a liquid rubber D2. This may be, for example, a carboxyl-terminated or epoxide-terminated polymer.

In a first embodiment, this liquid rubber may be a carboxyl- or epoxide-terminated acrylonitrile/butadiene copolymer or a derivative thereof. Liquid rubbers of this kind are available commercially, for example, under the name Hypro/Hypox® CTBN and CTBNX and ETBN from Emerald Performance Materials. Suitable derivatives are, in particular, elastomer-modified prepolymers containing epoxide groups, of the kind marketed commercially under the product line Polydis®, especially from the product line Polydis® 36, by the company Struktol® (Schill+Seilacher Group, Germany), or under the product line Albipox (Evonik, Germany).

In a second embodiment, this liquid rubber may be a polyacrylate liquid rubber, which is fully miscible with liquid epoxy resins and which separates only when the epoxy resin matrix is cured, to form microdroplets. Liquid polyacrylate rubbers of this kind are available, for example, under the designation 20208-XPA from Dow.

It is of course also possible to use mixtures of liquid rubbers, more particularly mixtures of carboxyl- or epoxide-terminated acrylonitrile/butadiene copolymers or of derivatives thereof.

The toughness improver D in a third embodiment may be a core-shell polymer D3. Core-shell polymers consist of an elastic core polymer and a rigid shell polymer. Particularly suitable core-shell polymers are composed of a core of elastic acrylate polymer or butadiene polymer, surrounded by a rigid shell of a rigid thermoplastic polymer. This core-shell structure either forms spontaneously by separation of a block copolymer, or is dictated by the polymerization regime as latex or suspension polymerization with subsequent grafting. Preferred core-shell polymers are those known as MBS polymers, which are available commercially under the trade name Clearstrength™ from Arkema, Paraloid™ from Dow or F-351™ from Zeon.

With particular preference the one-component thermosetting epoxy resin adhesive comprises terminally blocked polyurethane polymers D1, most preferably only terminally blocked polyurethane polymers D1.

The thermosetting one-component epoxy resin adhesive further comprises preferably at least one gelling agent. By adding said gelling agent, the basic viscosity of the thermosetting one-component epoxy resin adhesive can be increased. A gelling agent is a polymer which leads to gelation when it dissolves in liquid epoxy resin at an elevated temperatures of more than 100° C., preferably 100° C. to 150° C., so as to better control the viscosity and rheology of the composition. The gelling agent is preferably selected from the list consisting of polyacrylates, polyvinyl butyrates and polyvinyl chlorides. Preferred gelling agents are polyvinyl butyrates.

The fraction of the at least one gelling agent is preferably from 0.25-3 wt %, 0.5-2 wt %, 0.75-1.5 wt %, more preferably 0.75-1.25 wt %, based on the total weight of the one-component thermosetting epoxy resin adhesive.

In one preferred embodiment, the one-component thermosetting epoxy resin adhesive further comprises at least one filler F. Preference here is given to mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic beads, hollow glass beads, hollow organic beads, glass beads, colour pigments. Particularly preferred are fillers selected from the group consisting of calcium carbonate, calcium oxide and fumed silicas.

The total fraction of the overall filler F is advantageously 5-40 weight-%, preferably 10-35 weight-%, 15-30 weight-%, most preferably 20-30 weight-%, based on the total weight of the epoxy resin adhesive.

The one-component thermosetting epoxy resin adhesive may comprise further constituents, especially stabilizers, particularly heat and/or light stabilizers, plasticizers, solvents, dyes and pigments, corrosion inhibitors, surfactants, defoamers and adhesion promoters.

The one-component thermosetting epoxy resin adhesive has a viscosity of 500 to 5000 Pas at 25° C. Preferably, the viscosity is from 500 to 2000 Pas, 500 to 1500 Pas, preferably 500 to 1300 Pas at 25° C. The viscosity is determined oscillographically by means of a rheometer with heatable plate (MCR 301, AntonPaar) (slot 1000 μm, measuring plate diameter: 25 mm (plate/plate), deformation 0.01 at 5 Hz, temperature: 25° C.).

A particularly preferred thermosetting one-component epoxy resin adhesive comprises:
- 25-70 wt.-%, 30-60 wt.-%, 35-55 wt.-%, more preferably 40-50 wt.-%, based on the total weight of the one-component thermosetting epoxy resin adhesive, of at least one epoxy resin A,
- 2-7 wt.-%, 3-6 wt.-%, 3.5-5.5 wt.-%, more preferably 4-5 wt.-%, based on the total weight of the one-component thermosetting epoxy resin adhesive, of at least one epoxy novolac EN;
- preferably 1.5-7.5 wt.-%, more particularly 2-5 wt.-%, 2-3 wt.-%, based on the total weight of the one-component thermosetting epoxy resin adhesive, of at least one epoxy-bearing reactive diluent G;
- 1-8 wt %, more particularly 2-6 wt %, based on the total weight of the one-component thermosetting epoxy resin adhesive, of at least one latent hardener B for epoxy resins, more particularly dicyandiamide;
- preferably 0.05-2 wt.-%, more particularly 0.1-1 wt.-%, 0.15-0.5 wt.-%, more preferably 0.2-0.3 wt.-%, based on the total weight of the one-component thermosetting epoxy resin adhesive, of at least one accelerator C for epoxy resins;
- 7.5-35 wt.-%, 10-30 wt.-%, more preferably 15-25 wt.-%, based on the total weight of the one-component thermosetting epoxy resin adhesive, of at least one toughness improver D, preferably a terminally blocked polyurethane polymers D1;
- preferably 0.25-3 wt %, 0.5-2 wt %, 0.75-1.5 wt %, more preferably 0.75-1.25 wt %, based on the total weight of the one-component thermosetting epoxy resin adhesive, of at least one gelling agent selected from the list consisting of polyacrlylates, polyvinyl butyrates and polyvinyl chlorides, preferably polyvinyl butyrates;
- preferably 5-40 weight-%, preferably 10-35 weight-%, 15-30 weight-%, most preferably 20-30 weight-%, based on the total weight of the one-component thermosetting epoxy resin adhesive, of a filler F selected from the group consisting of calcium carbonate, calcium oxide and fumed silicas.

Preferably, the thermosetting one-component epoxy resin adhesive has a viscosity of 500 to 2000 Pas, 500 to 1500 Pas, preferably 500 to 1300 Pas at 25° C.

It may further be advantageous if the preferred one-component thermosetting epoxy resin adhesive consists to an extent of more than 80 weight %, preferably more than 90 weight %, more particularly more than 95 weight %, especially preferably more than 98 weight %, most preferably more than 99 weight %, based on the total weight of the epoxy resin adhesive, of the aforementioned constituents.

It is advantageous when the cured one-component thermosetting epoxy resin adhesive of the invention after curing for 10 min at 160° C. has the following properties:
- Stress durability test as described in Ford FLTM BV 101-07, preferably as described in the experimental section: withstanding 20 cycles, preferably ≥25 cycles, ≥30 cycles, ≥40 cycles, ≥50 cycles, ≥60 cycles, most preferably ≥65 cycles;
- Shear strength according to SAE J1523 with 1.5 mm-thick high strength hot dip galvanized steeel (HDG) coupons, 0.25 mm adhesive bondline thickness, 13 mm length overlap, 13 mm/min pull rate: ≥20 MPa, preferably 25 MPa, ≥28 MPa, ≥30 MPa, ≥32 MPa, most preferably ≥35 MPa.

Adhesives of this kind are needed for the bonding of heat-stable materials. By heat-stable materials are meant materials which are dimensionally stable, at least during the cure time, at a curing temperature of 100-220° C., preferably 120-200° C. They are, more particularly, metals and plastics such as ABS, polyamide, polyphenylene ethers, compounded materials such as SMC, unsaturated polyesters GRP and composite epoxide or acrylate materials. Particularly heat-stable plastics, furthermore, are polysulfones or polyethersulfones.

A preferred application is when at least one material is a metal.

Considered a particularly preferred use is the adhesive bonding of identical or different metals, particularly in body construction within the automotive industry. The preferred metals are, in particular, steel, especially electrolytically galvanized, hot dip galvanized, oiled steel, Bonazinc-coated steel, and subsequently phosphated steel, and also aluminium, particularly in the versions typically encountered in car making.

Such an adhesive is especially contacted first with the materials to be bonded at a temperature of between 10° C. and 80° C., especially between 10° C. and 60° C., and later cured at a temperature of typically 130-220° C., preferably 140-180° C., more preferably 150-170° C.

A further aspect of the present invention relates to a method of bonding heat-stable substrates, comprising the steps of:
i) applying a heat-curing epoxy resin composition as described in detail above to the surface of a heat-stable substrate S1, especially of a metal;
ii) contacting the heat-curing epoxy resin composition applied with the surface of a further heat-stable substrate S2, especially of a metal;
iii) heating the composition to a temperature of 100-220° C., especially of 120-210° C., preferably between 130 and 190° C., 140 and 180° C. more preferably between 150 and 170° C.

The substrate S2 here consists of the same material as or a different material than the substrate S1.

The substrates S1 and/or S2 are especially the aforementioned metals and plastics.

Preferably, in step iii) heating the composition to a temperature of 100-220° C., especially of 120-210° C., preferably between 130 and 190° C., 140 and 180° C. more preferably between 150 and 170° C., the composition is left at the aforementioned temperature for 10 min-6 h, 10 min-2 h, 10 min-60 min, 10 min-30 min, 10 min-20 min, more preferably 10 min-15 min.

Such a method of bonding heat-stable materials results in an adhesive-bonded article. Such an article is preferably a motor vehicle or part of a motor vehicle.

A further aspect of the present invention is therefore an adhesive-bonded article obtained from the aforementioned method. In addition, the compositions of the invention are suitable not just for automobile construction but also for other fields of use. Particular mention should be made of related applications in the transportation sector such as ships, trucks, buses or rail vehicles, or in the construction of consumer goods, for example washing machines.

The materials adhesive-bonded by means of a composition of the invention are used at temperatures between typically 120° C. and −40° C., preferably between 100° C. and −40° C., especially between 80° C. and −40° C.

One particularly preferred use of the thermosetting epoxy resin adhesive of the invention is the use thereof as a thermosetting body construction adhesive in vehicle construction.

A further particularly preferred use of the thermosetting epoxy resin adhesive of the invention is the use thereof for adhesively bonding metal structures.

A further aspect of the present invention therefore relates to a cured epoxy resin adhesive which is obtained by the heating of a thermosetting epoxy resin adhesive, described in detail above, to a temperature of 100-220° C., preferably 120-210° C.

After passing through a CEC bath, the bodywork enters a CEC oven, where the CEC coating material is baked at a temperature of typically 160 to 190° C. The thermosetting composition reacts here chemically with crosslinking, leading to the curing of the adhesive.

The invention further encompasses the use of at least one epoxy novolac EN, as described before, for increasing the amount of cycles in the stress durability test as described in Ford FLTM BV 101-07, preferably as described in the experimental section, of a one-component thermosetting epoxy resin adhesive, more particularly of a thermosetting epoxy resin adhesive in vehicle construction and sandwich panel construction. This is preferably a thermosetting epoxy resin adhesive as described above. The increase in the amount of cycles relates to a comparison with one-component thermosetting epoxy resin adhesives which do not contain any of the aforementioned at least one epoxy novolac EN. The nature and amount of the epoxy novolac EN used is preferably as described above, and in particular the natures and amounts identified above as being preferred are also used with preference.

The invention is elucidated further in the text below by means of examples which, however, are not intended to restrict the invention in any way.

EXAMPLES

Test methods used for the testing of the respective properties in the examples were as follows:

Stress Durability

The stress durability was determined based on the "Ford Standards Testing" procedure of "BV 101-07 Stress durability test for lap-shear bonds".

The test samples were determined using the following set-up:

Test temperature: 23° C.

Substrate: 1.6 mm thick alloy 5754 aluminium coupons coated with Alcoa 951 and Quacker DC2-90.

Bond area: 12.7 mm×25.4 mm

Adhesive layer thickness: 0.25 mm

Curing: 10 min at 160° C.

Applied load: 2400N

Testing Examples

The base formulation used for epoxy resin adhesives was a formulation as described below.

TABLE 1

| Raw material | Ref wt.-% | Ex. 1 wt.-% | Ex. 2 wt.-% | Ex. 3 wt.-% |
| --- | --- | --- | --- | --- |
| Liquid epoxy resin of formula (II), DER 331 | 49.5 | 46.5 | 45 | 43.5 |
| Reactive diluent G, p-t-butyl phenyl glycidyl ether | 2.6 | 2.6 | 2.6 | 2.6 |
| Epoxy novolac EN, DEN 439 (EEW 191 to 210 g/eq, functionality 3.8) | 0 | 3 | 4.5 | 6 |
| Terminally blocked polyurethane polymer D1 of formula (I) | 20 | 20 | 20 | 20 |
| Latent hardener B, Dicyandiamide | 4 | 4 | 4 | 4 |
| Accelerator C for epoxy resins, substituted urea | 0.2 | 0.2 | 0.2 | 0.2 |
| Filler mixture of calcium carbonate, calcium oxide and fumed silica | 22.8 | 22.8 | 22.8 | 22.8 |
| Gelling agent, polyvinyl butryal | 0.9 | 0.9 | 0.9 | 0.9 |
| Total | 100 | 100 | 100 | 100 |
| Stress Durability 160° C./10' (Cycles) | 34 | 42 | 65 | 60 |

The viscosicty of the compositions Ref, and Ex.1-Ex.3 were measured and found to be between 500 to 1300 Pas at 25° C., the viscosity being determined oscillographically by means of a rheometer with heatable plate (MCR 301, AntonPaar) (slot 1000 μm, measuring plate diameter: 25 mm (plate/plate), deformation 0.01 at 5 Hz, temperature: 25° C.).

The invention claimed is:

1. A one-component thermosetting epoxy resin adhesive, comprising;

a) at least one epoxy resin A of the formula (II)

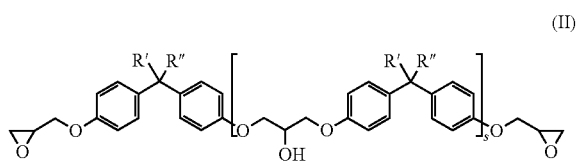

wherein:
the substituents R' and R" independently of one another are either H or $CH_3$, and
the index s has a value of 0-0.2,
the fraction of the epoxy resin A being from 20-70 wt.-%, based on the total weight of the one-component thermosetting epoxy resin adhesive; and b) at least one epoxy novolac EN of the formula

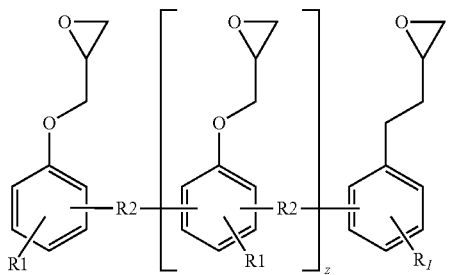

wherein:
R2=

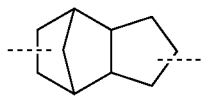

or CH$_2$,
R1=H or methyl, and
z=0-7,
the fraction of epoxy novolac EN being from 1-8 wt.-% based on the total weight of the one-component thermosetting epoxy resin adhesive; and
   c) at least one latent hardener B for epoxy resins; and
   d) optionally at least one accelerator C for epoxy resins; and
   e) at least at least one toughness improver D,
the fraction of toughness improver D being from 5-40 wt.-%, based on the total weight of the one-component thermosetting epoxy resin adhesive;
   wherein the epoxy resin adhesive has a viscosity of 500 to 5000 Pas at 25° C., as determined oscillographically by means of a rheometer with a heatable plate when measured with a deformation 0.01 at 5 Hz.

2. The one-component thermosetting epoxy resin adhesive according to claim 1, wherein the fraction of epoxy novolac EN is from 2-7 wt.-%, based on the total weight of the one-component thermosetting epoxy resin adhesive.

3. The one-component thermosetting epoxy resin adhesive according to claim 1, wherein in the epoxy novolac EN, R2=CH$_2$, R1=H, and z=1-2.

4. The one-component thermosetting epoxy resin adhesive according to claim 1, wherein the fraction of the epoxy resin A of the formula (II) is from 25-70 wt.-%, based on the total weight of the one-component thermosetting epoxy resin adhesive.

5. The one-component thermosetting epoxy resin adhesive according to claim 1, wherein in the epoxy resin A the substituents R' and R" are CH$_3$.

6. The one-component thermosetting epoxy resin adhesive according to claim 1, wherein the latent hardener B is selected from the group consisting of dicyandiamide, guanamines, guanidines, aminoguanidines and derivatives thereof, substituted ureas, imidazoles and amine complexes.

7. The one-component thermosetting epoxy resin adhesive according to claim 1, comprising the accelerator C for epoxy resins, which is selected from the group consisting of substituted ureas, imidazoles, imidazolines and blocked amines.

8. The one-component thermosetting epoxy resin adhesive according to claim 1, further comprising:
   at least one epoxy-bearing reactive diluent G,
   the fraction of the epoxy-bearing reactive diluent G being from 1-10 wt.-%, based on the total weight of the one-component thermosetting epoxy resin adhesive.

9. The one-component thermosetting epoxy resin adhesive according to claim 1, further comprising at least one gelling agent.

10. The one-component thermosetting epoxy resin adhesive according to claim 1, wherein the toughness improver D is selected from the group consisting of terminally blocked polyurethane polymers D1, liquid rubbers D2 and core-shell polymers D3.

11. The one-component thermosetting epoxy resin adhesive according to claim 1, wherein the adhesive withstands ≥20 cycles of lap-shear cycling at a temperature of 23° C. and an applied load of 2400 N after curing for 10 minutes at 160° C.

12. A method for adhesively bonding heat-stable substrates, the method comprising:
   i) applying a thermosetting epoxy resin adhesive according to claim 1 to the surface of a heat-stable substrate S1;
   ii) contacting the applied thermosetting epoxy resin adhesive with the surface of a further heat-stable substrate S2; and
   iii) heating the thermosetting epoxy resin adhesive to a temperature of 100-220° C.;
   wherein the substrate S2 consists of the same material as or a different material to the substrate S1.

13. A method according to claim 12, wherein in iii) heating the thermosetting epoxy resin adhesive, the thermosetting epoxy resin adhesive is left at the temperature of 100-220° C. for 10 min-6 h.

14. A method comprising:
   adhesively bonding or strengthening metal structures using the one-component thermosetting epoxy resin adhesive according to claim 1.

15. A method comprising:
   strengthening filling of cavities in vehicle construction or sandwich panel construction using the one-component thermosetting epoxy resin adhesive according to claim 1.

16. The one-component thermosetting epoxy resin adhesive according to claim 1, wherein the fraction of the toughness improver D is from 15-40 wt.-%, based on the total weight of the one-component thermosetting epoxy resin adhesive.

17. The one-component thermosetting epoxy resin adhesive according to claim 1, wherein the toughness improver D is a terminally blocked polyurethane polymer D1.

18. The one-component thermosetting epoxy resin adhesive according to claim 1, wherein the fraction of latent hardener B is from 0.5-4 wt.-%, based on the total weight of the one-component thermosetting epoxy resin adhesive.

* * * * *